Figure 1:
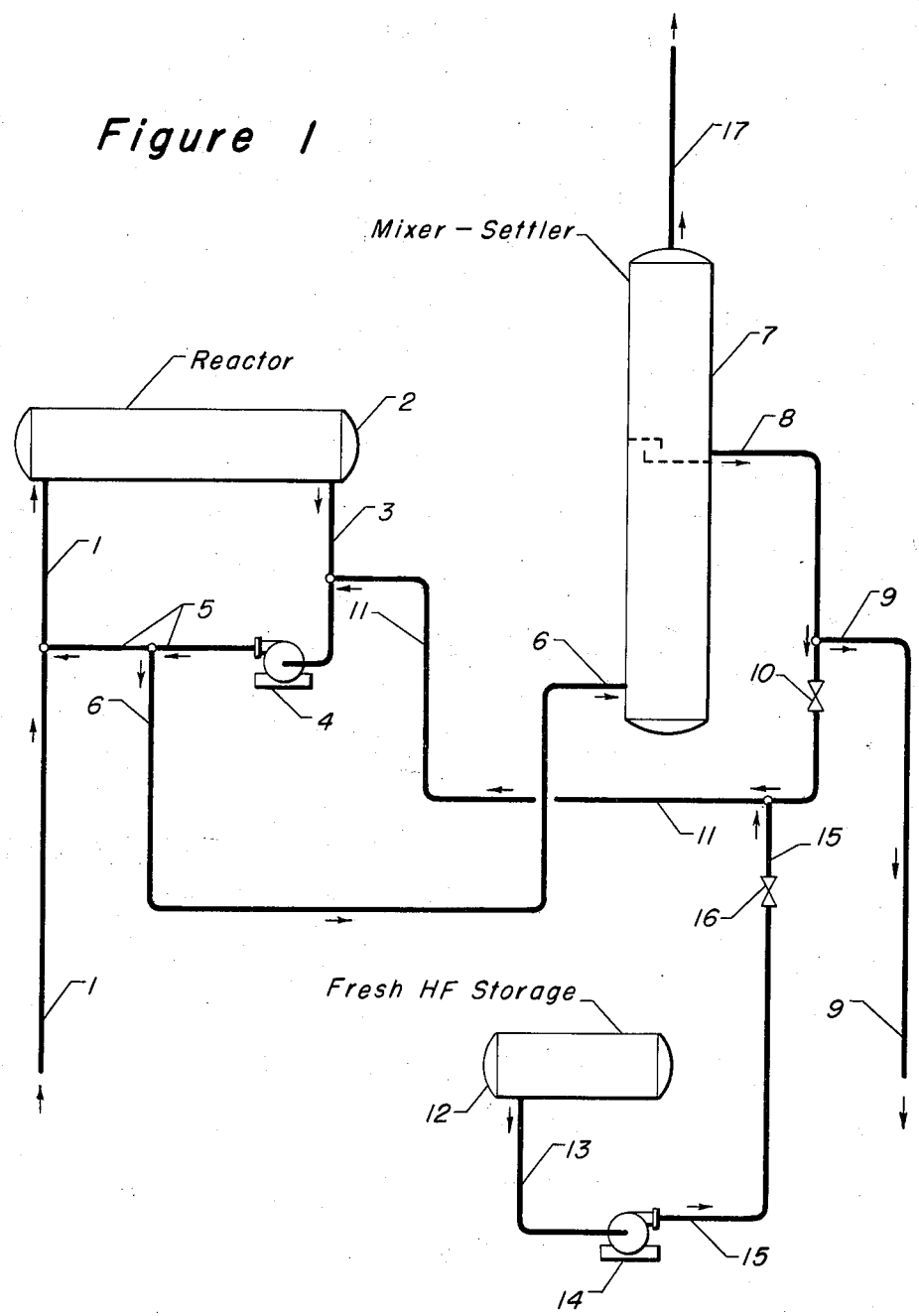

May 3, 1966      E. R. FENSKE      3,249,650

ISOPARAFFIN ALKYLATION PROCESS

Filed Oct. 18, 1963      2 Sheets-Sheet 2

*Figure 2*

INVENTOR:
Ellsworth R. Fenske

BY: James R. Hoatson Jr.
Raymond H. Nelson
ATTORNEYS

United States Patent Office 3,249,650
Patented May 3, 1966

3,249,650
ISOPARAFFIN ALKYLATION PROCESS
Ellsworth R. Fenske, Palatine, Ill., assignor to Universal Oil Products Company, Des Plaines, Ill., a corporation of Delaware
Filed Oct. 18, 1963, Ser. No. 317,262
6 Claims. (Cl. 260—683.48)

This invention relates to an improved process for the production of an isoparaffin-olefin reaction product whereby an alkylate product of enhanced product quality subsequently is obtained.

Production of higher molecular weight isoparaffins having valuable anti-knock properties and therefore suitable for use in automotive and aviation fuels is of considerable importance in the petroleum refining industry. Furthermore, the introduction of automobile engines of high compression ratio has necessitated the utilization of high anti-knock fuels in these engines to obtain maximum horsepower output therefrom. Thus, the demand for higher and higher octane number fuels has led to increased use of higher molecular weight isoparaffins as blending agents and gasolines.

A convenient source of such higher molecular weight isoparaffins is the catalytic alkylation of low boiling isoparaffins such as isobutane with olefins, such as, for example, propylene, the butylenes, the amylenes and mixtures thereof. It is therefore an object of this invention to provide an improved process which will yield such high octane motor fuels. It is a further object of this invention to provide an improved process for the production of an isoparaffin-olefin reaction product utilizing a novel reactor system which has produced alkylates of superior octane compared with alkylates obtained from all previous commercial designs. It is a further object of this invention to accomplish this enhancing of product quality without increasing the isobutane to olefin ratio in such a process thereby effecting economy of operation. A still further object of this invention is to provide an improved process for the production of an isoparaffin-olefin reaction product whereby a relatively clean reaction system with less side reactions is utilized to produce high octane alkylates with endpoints well below the 400° F. specification for motor fuel alkylate while, at the same time, acid consumption per barrel of alkylate produced is significantly less than any of the so-called modern hydrogen fluoride alkylation units in commercial use today.

One embodiment of this invention provides an improved process for the production of an isoparaffin-olefin reaction product which comprises passing an isoparaffin-olefin hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycle settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

A further embodiment of this invention provides an improved process for the production of an isobutane-olefin reaction product which comprises passing an isobutane-olefin hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

A specific embodiment of this invention provides an improved process for the production of an isobutane-butylene reaction product which comprises passing an isobutane-butylene hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

Another specific embodiment of this invention provides an improved process for the production of an isobutane-propylene-butylene reaction product which comprises passing an isobutane-propylene-butylene hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

Other objects and embodiments of the present invention will become apparent in considering the specification as hereinafter set forth.

This invention can be most clearly described and illustrated with reference to the attached drawings. While of necessity, certain limitations must be present in such schematic descriptions, no intention is meant thereby to limit the generally broad scope of this invention. FIGURE 1 is a flow sheet of a novel reactor system illustrating the steps which comprise the invention. FIGURE 2 is a schematic flow sheet of a hydrogen fluoride alkylation process having embodied therein the present invention.

As stated hereinabove, this invention relates to an improved process for the production of an isoparaffin-olefin reaction product. Although the present process is particularly applicable to the alkylation of isobutane with a butylene-containing olefinic feed stock, the process is also applicable to other isoparaffinic and other olefinic hydrocarbon feed stocks to produce motor fuel or aviation alkylates or higher boiling aliphatic hydrocarbon products. Thus, other paraffinic hydrocarbons such as isopentane, one or more of the isohexanes, or mixtures of the aforementioned isoparaffins, branched-chain heptanes and other aliphatic hydrocarbons of branched type and chain structure may be utilized as feed stock. Similarly, as olefinic reactants, the normally gaseous olefins including propylene, 1-butene, 2-butene, isobutylene, the isomeric amylenes, the hexenes, the heptenes and higher molecular weight olefinic hydrocarbons may be utilized as the olefinic hydrocarbon alkylating agent in the process. The first step of the process of this invention comprises passing an isoparaffin-olefin hydrocarbon stream in admixture with hydrogen fluoride catalyst to an alkylation reactor. Referring then to FIGURE 1, an isoparaffin-olefin hydrocarbon stream is passed via line 1 to reactor 2. Fresh hydrogen fluoride catalyst, in controlled amounts, is withdrawn from storage vessel 12 via line 13 by pump 14 and passed via line 15 through control valve 16 to line 11, and then passed via line 3, pump 4 and line 5 to admix with the isoparaffin-olefin hydrocarbon stream in line 1 prior to passage to alkylation reactor 2.

The alkylation reaction is conducted in the presence of a hydrogen fluoride catalyst introduced into reactor 2 generally in an amount sufficient to provide a catalyst to hydrocarbon volume ratio in the alkylation reactor of from about 0.5 to about 2.5. By the term "hydrogen fluoride catalyst" as used throughout this specification and appended claims, it is intended to include catalysts wherein hydrogen fluoride is the essential active ingredient. Thus, it is within the scope of my invention to employ substantially anhydrous fluoride or hydrofluoric acid or hydrogen fluoride containing various additives or promoters or boron trifluoride. Ordinarily, commercial anhydrous hydrogen fluoride will be charged to the alkylation system as fresh catalyst. However, it is possible to use hydrogen fluoride containing as much as about 10% water or more. Excessive dilution with water is generally undesirable since it tends to reduce the alkylating activity of the catalyst and introduces corrosion problems. In order to reduce the tendency of the olefinic portion of the feed stock to undergo polymerization prior to alkylation in reactor 2, the molar proportion of isoparaffins to olefinic hydrocarbons in the alkylation reactor is desirably maintained at a value greater than 1, up to about 20:1 and preferably from about 3:1 to about 15:1. The alkylation reaction occurs at temperatures in reactor 2 of from about 0° to about 200° F. and preferably from about 30° to about 110° F. Generally, some means of removing the heat of reaction from reactor 2 must be provided, for example, through means not shown such as an internal cooler or a heat exchanger. The pressure on the alkylation system is ordinarily just high enough to maintain the hydrocarbons and catalyst in substantially liquid phase, that is, from about atmospheric to about 40 atmospheres or more. The contact time in the alkylation reactor is conveniently expressed in terms of space time which is defined as the volume of catalyst within the reactor or contacting zone divided by the volume rate per minute of hydrocarbon reactants charged to the zone. Usually the space time will be less than 5 minutes and preferably be less than about 2 minutes. At least a portion of the hydrocarbon-hydrogen fluoride mixture contained in reactor 2 is continuously withdrawn from reactor 2 via line 3 and admixed with recycle settled hydrogen fluoride via lines 8 and 11 as hereinafter set forth. At least a portion of said resultant mixture is emulsified and passed back to the reactor via lines 3, 5 and 1. The balance or net amount of said emulsified mixture is then passed via lines 5 and 6 to a lower section of vertical mixer-settler 7 for passage upwardly therethrough. The mixture is upwardly passed through vertical mixer-settler 7 while simultaneously maintaining the mixture in the mixer portion of the mixer-settler for an average residence time of from about 60 seconds to about 1200 seconds, and preferably from about 100 seconds to about 800 seconds, depending upon the composition of the mixture charged to the mixer-settler. In the mixer portion of the mixer-settler, turbulent flow is produced by means not shown such as a predetermined number of perforated plates or decks in the vessel. Therefore, "residence time" is defined as the volume of the turbulent flow hydrocarbon-hydrogen fluoride mixture divided by the total net flow of acid plus hydrocarbon. When the desired residence time in the mixer portion of the mixer-settler has been reached, as preset by the geometry of the mixer-settler, hydrocarbons free from a major portion of hydrogen fluoride are withdrawn from an upper section of the mixer-settler as indicated in FIGURE 1 via line 17 and settled hydrogen fluoride is withdrawn for recycle via sidecut means line 8 from an intermediate section of the mixer-settler. The recycle settled hydrogen fluoride is passed via line 8 through pressure control valve 10 and then via line 11 to admix with the hydrocarbon-hydrogen fluoride mixture contained in line 3 and pumped via pump 4 to line 5 for passage via line 1 to reactor 2. A portion of the settled hydrogen fluoride may be passed via line 9 to acid regenerator means not shown in FIGURE 1.

As will be set forth hereinafter in greater detail with reference to FIGURE 2, this novel reactor system as described with reference to FIGURE 1 has provided an improved process for the production of an isoparaffin-olefin reaction product whereby a relatively clean reaction system with less side reactions is utilized to produce high octane alkylates with end points well below the 400° F. specification for motor fuel alkylate while, at the same time, acid consumption per barrel of alkylate produced was significantly less than any of the so-called modern hydrogen fluoride alkylation units in commercial use today and, the production of tars, polymers, and combined fluorides which have always been a problem in commercial hydrogen fluoride alkylation plants is reduced.

A specific example of the operation of the process with hydrogen fluoride as the alkylation catalyst and as the process is carried out as set forth hereinabove with reference to FIGURE 1 is described herewith now in connection with FIGURE 2.

This example illustrates the process of the present invention for the production of an isoparaffin-olefin reaction product whereby an alkylate product of enhanced product quality subsequently is obtained at a very low and heretofore unobtainable catalyst consumption rate. An olefin-containing feed stock in the quantity of 2104 barrels per day is commingled with an isoparaffin-containing feed stock in the quantity of 241 barrels per day and passed to pretreatment means, not shown, for substantial drying of the feed stock and the pretreated stream is passed as a liquid through line 101 to alkylation reactor 102. The composition of the olefin-containing feed stream prior to commingling, in mol percent, is as follows: ethane, 0.1%; propylene, 20.1%; propane, 14.8%; butylenes, 24.1%; isobutane, 30.9%; normal butane, 9.8%; pentanes, 0.2%. The composition of the isoparaffin-containing feed stock is 0.8 mol percent propane, 94.8 mol percent isobutane and 4.4 mol percent normal butane. An isobutane-rich paraffin recycle stream is admixed with the isoparaffin-olefin hydrocarbon stream in line 101 via line 145, hereinafter described, and is returned to the reactor. The combined feed in line 101, that is, the isoparaffin-olefin hydrocarbon stream in combination with the isobutane-rich paraffin recycle stream produced as hereinafter described, is admixed with hydrogen fluoride catalyst in controlled amounts so that an acid to hydrocarbon volume ratio of 2.0 is maintained. Initially, fresh hydrogen fluoride catalyst is withdrawn from storage vessel 112 via line 113 by pump 114 and passed via line 115 through control valve 116 to line 111 and then passed vial line 103, pump 104 and line 105 to admix with the combined feed in line 101, as hereinabove described, prior to passage to alkylation reactor 102. In order to reduce the tendency of the olefinic portion of the feed stock to undergo polymerization prior to alkylation in reactor 102, the molar proportion of iso-paraffins to olefinic hydrocarbons in the alkylation reactor is desirably maintained at a value in the range of from about 3:1 to about 15:1 molal. Reactor 102 is maintained at a temperature of about 75° F. to effect the desired alkylation in the present case. Means of removing the heat of reaction from reactor 102 must be provided, for example, through means not shown such as an internal cooler or a heat exchanger. The pressure on the alkylation reactor system is maintained at about 15 atmospheres to maintain the hydrocarbons and catalyst in substantially liquid phase. As hereinbefore set forth with reference to FIGURE 1, contact time in the alkylation reactor is conveniently expressed in terms of space time which is defined as the volume of catalyst within the reactor or contacting zone divided by the volume rate per minute of hydrocarbon reactants charged to the zone. Contact time in reactor 102 was maintained for a period of 1 minute where the mixture was intimately contacted with the catalyst so that alkylation occurred. In the present case, the reactor was water-cooled to remove the heat evolved by the reaction. At least a portion of the hydrocarbon-hydrogen fluoride contained in reactor 102 is continuously withdrawn from reactor 102 via line 103 and admixed with recycle settled hydrogen fluoride via lines 108 and 111 as hereinafter set forth. At least a portion of said resultant mixture is emulsified and passed back to the reactor via lines 103, 105, and 101. The balance or net amount of said emulsified mixture is then passed via lines 105 and 106 to a lower section of vertical mixer-settler 107 for passage upwardly therethrough. In this manner of operation, the emulsion circulation provides mixing within the reactor and is also utilized as a heat sink. In addition, pump 104 is utilized as the means for pumping the emulsion back to the reactor and provides means for varying the hydrocarbon to acid rate with one pump thereby effecting economy of operation.

Vertical mixer-settler 107 is a vessel 35 feet high, 8 feet in diameter and contains in the mixer portion of the mixer-settler, that is, the bottom portion of this vessel, 20 decks or trays or perforated plates at 1 foot spacings designed for a total 8 to 10 pounds pressure drop. As hereinbefore set forth with reference to FIGURE 1, residence time in the mixer portion of the mixer-settler is defined as the volume of the turbulent flow hydrocarbon-hydrogen fluoride mixture divided by the total net flow of acid plus hydrocarbon. Therefore, with the mixer-settler geometry preset, the average residence time added to the operation while the mixture is upwardly passed through the vertical mixer-settler is about 300 seconds. Turbulent flow is of course produced by the perforated plates or decks at the high rate of flow that the feed is passed to mixer-settler 107 inasmuch as the present case, pump 104 is a 6000 gallon per minute circulating pump. As the desired residence time in the mixer portion of the mixer-settler has been reached, the hydrocarbons and the hydrogen fluoride separate in the settling portion of the mixer-settler. Hydrocarbons free from a major portion of hydrogen fluoride are withdrawn from an upper section of the mixer-settler as indicated in FIGURE 2 via line 117 and passed to isostripper 118 as hereinafter described. Settled hydrogen fluoride is withdrawn for recycle to the reactor via side-cut means line 108 from an intermediate section of the mixer-settler. The recycle settled hydrogen fluoride is passed via line 108 through pressure control valve 110 and then via line 111 to admix with the hydrocarbon-hydrogen fluoride mixture contained in line 103 and pumped via pump 104 to line 105 for passage via line 101 to reactor 102. A portion of the settled hydrogen fluoride is passed line 109 to acid regenerator 121.

In the present case, total hydrocarbon recycle obtained from the process via line 145, as will be hereinafter described in greater detail, in line 101 passing to reactor 102 is in the quantity of 16,531 barrels per day. The composition, in mol percent of this stream is as follows: propane, 10.7%; isobutane, 79.8%; normal butane, 8.9%; pentanes, 0.3%; and alkylate, 0.3%. Therefore, total combined feed to reactor 102 from line 101 just prior to passage thereto is in the amount of 18,874 barrels per day. The total combined feed is defined as the fresh feed plus the total hydrocarbon recycle as obtained from the process. The total combined feed composition, in mol percent, is as follows: ethane, trace; propylene, 2.4%; propane, 11.2%; butylenes, 2.9%; isobutane, 74.1%; normal butane, 9.0%; pentanes, 0.2%; and alkylate, 0.2%. The emulsion circulation rate is set at 141,985 barrels per day and the net material to mixer-settler 107 from line 106 is 55,415 barrels per day. Of this quantity, 18,515 barrels per day is hydrocarbon and the balance is hydrogen fluoride catalyst. The composition of the hydrocarbon portion of the feed to mixer-settler 107, in mol percent, is as follows: ethane, trace; propane, 12.1%; isobutane, 72.2%; normal butane, 9.5%; pentanes, 0.5%; alkylate, 5.7%; and tar, trace. In the mixer-settler vessel, the hydrocarbon-hydrogen fluoride mixture is subjected to turbulent flow and after the preset residence time has been completed, 18,615 barrels per day are withdrawn from the upper section of mixer-settler 107 via line 117 and passed to isostripper 118. Of this 18,615 barrels per day feed stream to the isostripper, 18,515 barrels per day hydrocarbon and 100 barrels per day hydrogen fluoride are present. Thus, hydrocarbons free from a major portion of hydrogen fluoride are withdrawn in this manner and passed to the isostripper. Side cut means line 108 from an intermediate section of the mixer-settler above the mixer portion of the vessel provides means for withdrawing 36,800 barrels per day of settled hydrogen fluoride. The majority of this settled acid is returned via lines 108 and 110 for passage back to reactor 102 as hereinbefore set forth. A minor portion of the settled hydrogen fluoride, namely 100 barrels per day is passed via line 109 to acid regenerator 121 via dual feed lines 119 and 120. In this manner of operation, an alkylate product of enhanced product quality is produced as will be set forth hereinafter with reference to the balance of the hydrogen fluoride alkylation process flow scheme as set forth in FIGURE 2.

As set forth hereinabove, hydrocarbons free from a major portion of hydrogen fluoride are withdrawn from the upper section of mixer-settler 107 via line 117 and introduced into isostripper 118. This introduction is made to the top tray of the isostripper. The isostripper is a fractionation column 7 feet in diameter containing 50 trays spaced 24 inches apart. It operates at a pressure of about 150 p.s.i.g. with a top temperature of about 155° F. and a bottoms temperature of about 350° F. It operates without external reflux. Isostripper 118 is fed near the middle of the vessel with a saturate butane stream. In the drawing, this saturate butane is represented as passing through line 128 into an upper middle portion of the isostripper. The exact point where the saturate butane stream should enter is determined by the ratio of iso to normal paraffins. This saturates stream supplies isobutane to supplement that contained in the olefin-containing feed. Excess normal butane is withdrawn further down in this column as a sidecut as indicated in the drawing by line 132, and leaves the system as a separate product.

Within isostripper 118, a substantial separation is made between the lower boiling isobutane and higher boiling normal butane and reaction products. A combination of isobutane flashing and alkylate stripping is accomplished in the isostripper. As set forth hereinabove, the column has no external reflux and operates as a true stripper. It is no longer necessary to employ high and therefore extremely costly reflux ratios to provide isobutane of high purity as recycle to the reactor. In addition, the normal butane present in the olefin feed to the alkylation unit, plus the normal butane that usually is found in the "outside" isobutane stream, plus the small amount of normal butane produced in the alkylation process itself all must leave the system. For example, if this normal butane were allowed to accumulate in the outlet, its vapor pressure would become extremely high and no control of vapor pressure of the product alkylate could be exercised without the use of a subsequent stabilizing step. In the design of modern alkylation units, vapor pressure control is achieved by withdrawing a vapor sidecut at the proper point on the isostripper as hereinbefore set forth. The position of the withdrawal point is usually chosen so that the normal butane side cut will contain less than about 5% isobutane and less than about 4% pentanes, and still allow for some control of the vapor pressure of the product alkylate.

In the present process, 350 barrels per day of saturate butanes from a crude unit depropanizer, not shown, is fed into line 128 to pass into isostripper 118. From line 132, 385 barrels per day of excess normal butane product leaves the system as a separate product. The composition of this stream in mol percent is 4.3% isobutane, 90.3% normal butane, 3.6% pentanes and 1.8% alkylate. Isostripper overhead in an amount of 16,915 barrels per day is withdrawn via line 133 and passed to condenser 134 as hereinafter described. The composition of the isostripper overhead fraction, in mol percent, is as follows: ethane, trace; propane, 13.0%; isobutane, 77.8%; normal butane, 8.6%; pentanes, 0.3%; and alkylate 0.3%. The bottoms product from isostripper 118 is recycled through fired heater 127, via lines 130 and 131, where high coil temperatures are maintained in order to decompose any organic fluorides which may be present in the alkylate. The net bottoms stream withdrawn from the isostripper represents finished motor fuel alkylate of the desired vapor pressure. In the present case, 1565 barrels per day of desired alkylate product is produced. The alkylate produced is of enhanced quality as compared to other so-called modern hydrogen fluoride alkylation units utilizing a mixed olefin feed stock. Complete alkylate inspections and comparisons are presented hereinafter the completion of the description of the process flow.

As set forth hereinabove, 16,915 barrels per day of isostripper overhead hydrocarbon and 100 barrels per day of hydrogen fluoride are withdrawn from isostripper 118 via line 133 and passed to condenser 134. The need for proper design of the overhead system of the isostripper is necessary since as shown hereinabove, propane is removed overhead along with the isobutane in the isostripper overhead product. By means of condenser 134, enrichment of the propane stream occurs whereby the size of the depropanizer column is greatly reduced. Thus, overhead product from the isostripper consisting essentially of isobutane is cooled and returned to the reactor together with the bottoms product from the depropanizer, hereinafter described.

In the present case, the isostripper overhead system comprising condenser 134, receiver 136, and lines 135, 138 and 137 are operated so that 14,975 barrels per day of net isostripper overhead having a composition, in mol percent of propane, 11.8%; isobutane, 78.8%; normal butane, 8.8%; pentanes, 0.3%; and alkylate, 0.3% is obtained in line 140 prior to admixing with depropanizer bottoms in line 144 to form the total hydrocarbon recycle, hereinbefore described, which is passed via line 145 to a commingling step with the fresh feed to the process as furnished by line 101. A drag stream of this material in line 145 is withdrawn via line 146 and passed to a bottom section of acid regenerator 121.

Acid regenerator 121 is a vessel 1½ feet in diameter and contains 5 decks or perforated plates at 18 inch spacings. It operates at a pressure of about 150 p.s.i.g. with a top temperature of about 190° F. and a bottoms temperature of about 400° F. As hereinbefore set forth, a minor portion of settled hydrogen fluoride, namely 100 barrels per day, is passed from mixer-settler 107 via lines 108 and 109 to dual feed lines 119 and 120. The regenerated hydrogen fluoride is purified in this regeneration zone by fractionation. The regenerated reconstituted hydrogen fluoride from zone 121 is passed through line 147 to admix with fresh hydrogen fluoride in line 113 and passes, as needed, as hereinbefore set forth to contactor 102 for recirculation in the process as hereinabove described. Heavy tar-like polymers and the constant boiling mixture are then passed via line 122 to tar settler 123 wherein the constant boiling mixture is passed via line 124 to a neutralizing pit and the tars produced by the process, in a quantity of usually less than 5 barrels per day is passed via line 125 along with heater fuel from line 126 to isostripper fired heater 127 as hereinbefore described. In this manner of operation, the acid regenerator produces reconstituted hydrogen fluoride which is returned to the process to maintain the hydrogen fluoride in an optimum strength in the process. The regenerator bottoms product is utilized to supply a portion of the fuel required for heater 127 so that economy of operation is practiced.

Referring back to the isostripper overhead system comprising condenser 134, receiver 136 and lines 135, 137 and 138, 16,915 barrels per day hydrocarbon and 100 barrels per day hydrogen fluoride are passed to condenser 134. By proper operation of this system, as hereinbefore described, 14,975 barrels per day of isostripper overhead is passed to a commingling step with the depropanizer bottoms and then passes to the reactor as total hydrocarbon recycle via line 145 to the process. The balance of the 16,915 barrels per day hydrocarbon and 100 barrels per day hydrogen fluoride stream that passes to condenser 134, that is, 1940 barrels per day of hydrocarbon having a composition, in mol percent, of ethane, 0.1%; propane, 23.1%; isobutane, 69.0%; normal butane, 7.7%; and pentanes, 0.1% are passed to settler 139 wherein 86 barrels per day of the hydrogen fluoride settles out and passes as an acid recycle stream to reactor 102 via line 141. The hydrocarbon portion of the material passing to settler 139 has entrained therein a small amount of hydrogen fluoride that passes to the depropanizer column. Thus, feed to the depropanizer column comprises 1940 barrels per day of hydrocarbon, hereinabove described, and 14 barrels per day of hydrogen fluoride. This feed stream passes from settler 139 via line 142 to depropanizer column 143.

Depropanizer column 143 is a vessel four feet in diameter containing 15 trays or perforated plates spaced 24 inches apart. The depropanizer column operates at a pressure of about 275 p.s.i.g. with a top temperature of about 125° F. and a bottoms temperature of about 215° F.

The purpose of the depropanizer column is to remove excess propane from the recycle isobutane stream. The depropanizer is operated so that the depropanizer bottoms stream is obtained in a quantity of 1556 barrels per day. This stream has a composition in mol percent, in line 144, prior to admixing with the 14,975 barrels per day of isostripper overhead in line 145, as follows: propane, 1.0%; isobutane, 89.1%; normal butane, 9.8%; and pentanes, 0.1%. This stream is then commingled in line 145 with the isostripper overhead from line 140 and passes as total hydrocarbon recycle to the reactor via line 145 as hereinabove described. The depropanizer overhead stream is withdrawn from depropanizer 143 via line 148 and passed to receiver 149 wherein a portion of the entrained hydrogen fluoride settles out and passes via line 150 to acid recycle line 141 hereinbefore described. The depropanizer overhead product still contains a small amount of hydrogen fluoride therein and therefore is charged to a small colunm, HF stripper 152 from receiver 149 via line 151. However, a portion of this stream is used as reflux for depropanizer column 143 and passes from line 151 via line 155 to a top portion of the depropanizer.

Hydrogen fluoride stripper 152 is a vessel 20 inches in diameter, and contains 20 trays spaced 12 inches apart. The hydrogen fluoride stripper is operated at a pressure of about 300 p.s.i.g. and a top and bottom temperature of about 143° F. In this manner of operation, 384 barrels per day of propane product is removed from hydrogen fluoride stripper 152 via line 156. The composition of this propane product, in mol percent, is as follows: ethane, 0.6%; propane, 98.3%; and isobutane, 1.1%. The hydrogen fluoride stripper removes the hydrogen fluoride from this propane-rich stream and the hydrogen fluoride is removed via line 153 and passed by control valve 154 to line 148 for passage to receiver 149 wherein the hydrogen fluoride thus remaining settles out and passes via line 150 to acid recycle stream 141 hereinbefore described.

When operating a hydrogen fluoride alkylation unit in the manner described hereinabove utilizing the improved process of the present invention, a motor fuel alkylate product having an end point well below 400° F. and a leaded octane greater than 105 at catalyst consumptions of less than 0.2 pound of hydrogen fluoride per barrel of alkylate produced is obtained. In addition, as set forth hereinafter, as will be evidenced by a comparison of alkylate products obtained from other units with the alkylate obtained from this unit running at the operating conditions substantially as described above, it is evident that, in fact, a superior alkylate has been produced from a propylene-containing feed stock in an economical operation.

In this first comparison, two alkylates were produced from two different hydrogen fluoride alkylation units. Plant "A" produced alkylate utilizing the flow scheme described hereinabove with reference to FIGURES 1 and 2. Plant "B" produced alkylate in another so-called modern hydrogen fluoride alkylation plant without the novel reactor system utilized in Plant "A." Plant "B" utilized a reactor system comprising a contacting zone and horizontal settling means. To fairly compare these two plants, an F-1 clear+3 cc. TEL target octane of greater than 105.0 was established as one test of the two designs. Operating conditions were chosen to achieve this target octane.

In order for Plant "B" to produce alkylate of this quality octane, it was found that at a reaction temperature of 75° F., an isobutane to olefin mol ratio of 20:1 was required at a hydrogen fluoride acidity of 91.5% to produce an F-1 clear+3 cc. TEL octane of 106.5. In addition, the propylene content of the total olefin feed to the unit was limited to only 19.4 volume percent. However, Plant "A" produced alkylate of 106.8 leaded octane (F-1 clear+3 cc. TEL) at 74° F. reaction temperature with an 11:1 isobutane to olefin mol ratio at a hydrogen fluoride acidity of 85.2%. Further, the propylene content of the total olefin feed to the plant was 31.7 volume percent, more than 1.6 times that of Plant "B." Therefore, it can only be concluded that alkylate produced from Plant "A" makes an alkylate superior to that made in Plant "B" since at about the same alkylate octane number Plant "A" produced an alkylate at a much lower isobutane to olefin ratio and with a higher propylene content of the charge at about the same reaction temperature and at a lower acidity. In addition, the alkylate produced by Plant "A" had 89.4 weight percent (of the total $C_8$'s produced) trimethylpentanes as compared to 86.6 weight percent (of the total $C_8$'s produced) in the alkylate produced by Plant "B" illustrating that less side reactions took place in the alkylation reaction occurring in Plant "A." There was also evidence of product degradation in the alkylate from Plant "B" from stagnation in this reactor system. The superior qualities of the alkylate produced by Plant "A" are further illustrated by a second comparison of another alkylate produced in this plant with an alkylate produced from Plant "C."

In this comparison, feed to Plant "C," a design similar to that of Plant "B," was 39% propylene by volume of total olefin fed to the plant while feed to Plant "A" was 33% propylene by volume of total olefin fed to the plant. The plants were operated at comparable operating conditions so that a valid across the board comparison could be made of the alkylates produced. Complete product inspections are presented in Table I.

TABLE I

| Plant | A | C |
|---|---|---|
| API gravity | 72.6 | 73.5 |
| RVP, pounds | 8.2 | 10.0 |
| Engler, ° F.: | | |
| I.B.P | 101 | 95 |
| 10% | 158 | 136 |
| 30% | 200 | 192 |
| 50% | 210 | 211 |
| 70% | 236 | 231 |
| 90% | 243 | 326 |
| 95% | 315 | 400 |
| 99% | 362 | 406 |
| E.P | 362 | 406 |
| Octane Number: | | |
| F-1 Clear | 94.0 | 91.6 |
| + 1 cc. TEL | 101.1 | 99.0 |
| + 3 cc. TEL | 105.6 | 102.5 |
| Composition, Weight Percent: | | |
| Isobutane | 0.1 | 0.3 |
| Normal Butane | 7.4 | 5.7 |
| Isopentane | 3.5 | 12.4 |
| Normal Pentane | | 0.3 |
| 2,3-Dimethylbutane | 2.5 | 3.5 |
| 2-Methylpentane | 0.6 | 1.2 |
| 3-Methylpentane | 0.3 | 0.5 |
| 2,2 and 2,4-Dimethylpentane | 6.1 | 5.9 |
| 2,2,3-Trimethylbutane | trace | 0.1 |
| 2-Methylhexane | 0.2 | 0.3 |
| 2,3-Dimethylpentane | 16.4 | 13.6 |
| 3-Methylhexane | 0.1 | 0.3 |
| 2,2,4-Trimethylpentane | 31.5 | 24.0 |
| 2,5-Dimethylhexane | 2.0 | 2.2 |
| 2,4-Dimethylhexane | 3.1 | 3.0 |
| 2,2,3-Trimethylpentane | 0.6 | 0.3 |
| 2,3,4-Trimethylpentane | 10.6 | 8.0 |
| 2,3,3-Trimethylpentane | 5.5 | 3.8 |
| 2,3-Dimethylhexane | 3.3 | 2.8 |
| 3,4-Dimethylhexane | 0.3 | 0.3 |
| $C_9$'s | 0.8 | 3.4 |
| $C_{10}$'s | 2.9 | 4.8 |
| $C_{11}$'s | 2.2 | 2.8 |
| $C_{12}$'s | trace | 0.4 |
| $C_{13}$'s | | 0.1 |
| Total | 100.0 | 100.0 |

Examination of the composition breakdowns presented in Table I indicates that the prime difference between the alkylates was the extent of by-product formation. The alkylate produced by Plant "C" was high in isopentane and higher in materials heavier than the $C_8$'s. The alkylate produced by Plant "C" had a $C_9$+ fraction of 11.5 weight percent compared to 5.9 weight percent produced by Plant "A." Further comparisons of the $C_8$ fractions of the alkylates produced indicates that the alkylate produced at Plant "A" had a more favorable distribution than that produced at Plant "C," that is, there are 48.2 weight percent (of the total alkylate) trimethylpentanes produced in alkylate from Plant "A" as compared to 36.1 weight percent (of the total alkylate) trimethylpentanes produced in Plant "C." The end point of the alkylates indicates further that alkylate from Plant "C" had more of heavy ends than that of alkylate from Plant "A." The product composition of alkylate from Plant "A" indicates therefore a relatively clean reaction system with less side reactions, and, with catalyst consumption being less than 0.2 pound of hydrogen fluoride per barrel of alkylate produced in Plant "A" indicates that the enhanced product quality of the alkylate produced, that is, the alkylate octane number and the alkylate product composition, was not sacrificed at the cost of an economical operation. Therefore, it is concluded that alkylate produced from Plant "A" utilizing the novel reactor system of the present invention is superior in product quality to that produced from other so-called modern hydrogen fluoride alkylation units in use today.

I claim as my invention:

1. An improved process for the production of an isoparaffin-olefin reaction product which comprises passing an isoparaffin-olefin hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycle settled hydrogen fluoride as hereinafter set forth, emulsifying and passing at least a portion of said resultant mixture back to the reactor, passing the balance of said emulsified mixture to a lower section of a vertical mixture-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

2. An improved process for the production of an isobutane-olefin reaction product which comprises passing an isobutane-olefin hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

3. An improved process for the production of an isobutane-propylene reaction product which comprises passing an isobutane-propylene hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixture portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

4. An improved process for the production of an isobutane-butylene reaction product which comprises passing an isobutane-butylene hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

5. An improved process for the production of an isobutane-propylene-butylene reaction product which comprises passing an isobutane-propylene-butylene hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same inside mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

6. An improved process for the production of an isobutane-propylene-butylene-amylene reaction product which comprises passing an isobutane-propylene-butylene-amylene hydrocarbon stream in admixture with hydrogen fluoride catalyst to an alkylation reactor, continuously withdrawing from said reactor at least a portion of the hydrocarbon-hydrogen fluoride mixture contained therein, admixing the same with recycled settled hydrogen fluoride as hereinafter set forth, emulsifying and passing at least a portion of said resultant mixture back to the reactor, passing the balance of said emulsified mixture to a lower section of a vertical mixer-settler for passage upwardly therethrough, upwardly passing said mixture through said vertical mixer-settler while simultaneously maintaining the same in said mixer portion of said mixer-settler for an average residence time of from about 60 seconds to about 1200 seconds, withdrawing hydrocarbons free from a major portion of hydrogen fluoride from an upper section thereof, and withdrawing settled hydrogen fluoride for recycle as aforesaid from an intermediate section thereof.

References Cited by the Examiner

UNITED STATES PATENTS

| 2,317,901 | 4/1943 | Frey | 260—683.48 |
| 2,717,913 | 9/1955 | Rollman | 260—683.48 |
| 2,910,522 | 10/1959 | Gerhold et al. | 260—683.48 |

DELBERT E. GANTZ, *Primary Examiner.*

R. H. SHUBERT, *Assistant Examiner.*